US012455522B2

(12) United States Patent
Tsuzuki

(10) Patent No.: US 12,455,522 B2
(45) Date of Patent: Oct. 28, 2025

(54) PRINTING APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Takashi Tsuzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 18/443,567

(22) Filed: Feb. 16, 2024

(65) Prior Publication Data

US 2024/0288805 A1 Aug. 29, 2024

(30) Foreign Application Priority Data

Feb. 27, 2023 (JP) ................................ 2023-028842

(51) Int. Cl.
*G03G 15/20* (2006.01)

(52) U.S. Cl.
CPC ................................ *G03G 15/2039* (2013.01)

(58) Field of Classification Search
CPC .................................................. G03G 15/2039
USPC ............................................................ 399/69
See application file for complete search history.

(56) References Cited

U.S. PATENT DOCUMENTS 9,733,598 B2 8/2017 Fukaya
2013/0063525 A1* 3/2013 Sieber .................. C23C 16/405 347/45
2016/0259278 A1* 9/2016 Izumiya ............. G03G 15/6588
2019/0095158 A1* 3/2019 Sugiyama ............ G06F 3/1285

FOREIGN PATENT DOCUMENTS

JP 2015168093 A 9/2015

* cited by examiner

*Primary Examiner* — Stephanie E Bloss
*Assistant Examiner* — Michael A Harrison
(74) *Attorney, Agent, or Firm* — VENABLE LLP

(57) ABSTRACT

A printing apparatus compares, while a given print job is executed, a temperature of a heating unit with fixing temperatures corresponding to a plurality of print jobs to be sorted, and performs, based on a comparison result, the sorting so that a predetermined order is descending order or ascending order of the fixing temperature. The sorting is performed so the predetermined order is ascending order of the fixing temperature in a case where the fixing temperatures corresponding the print jobs to be sorted are higher than the temperature of the heating unit and so the predetermined order is descending order of the fixing temperature in a case where the fixing temperatures corresponding the print jobs to be sorted are lower than the temperature of the heating unit.

6 Claims, 7 Drawing Sheets

FIG. 7A

| JOB NUMBER | JOB NAME | SHEET TYPE | FIXING TEMPERATURE |
|---|---|---|---|
| 001 | TOKYO.pdf | SHEET A | 40°C |
| 002 | SAITAMA.pdf | SHEET B | 80°C |
| 003 | OSAKA.pdf | SHEET C | 100°C |
| 004 | KANAGAWA.pdf | SHEET A | 70°C |
| 005 | FUKUOKA.pdf | SHEET C | 80°C |
| 006 | HIROSHIMA.pdf | SHEET A | 50°C |

FIG. 7B

| JOB NUMBER | JOB NAME | SHEET TYPE | FIXING TEMPERATURE | STATE |
|---|---|---|---|---|
| 001 | TOKYO.pdf | SHEET A | 40°C | PRINT PROCESSING IN PROGRESS |
| 006 | HIROSHIMA.pdf | SHEET A | 50°C | PRINT STANDBY STATE |
| 004 | KANAGAWA.pdf | SHEET A | 70°C | PRINT STANDBY STATE |
| 002 | SAITAMA.pdf | SHEET B | 80°C | PRINT STANDBY STATE |
| 005 | FUKUOKA.pdf | SHEET C | 80°C | PRINT STANDBY STATE |
| 003 | OSAKA.pdf | SHEET C | 100°C | PRINT STANDBY STATE |

FIG. 7C

| JOB NUMBER | JOB NAME | SHEET TYPE | FIXING TEMPERATURE | STATE |
|---|---|---|---|---|
| 006 | HIROSHIMA.pdf | SHEET A | 50°C | PRINT PROCESSING IN PROGRESS |
| 004 | KANAGAWA.pdf | SHEET A | 70°C | PRINT STANDBY STATE |
| 002 | SAITAMA.pdf | SHEET B | 80°C | PRINT STANDBY STATE |
| 005 | FUKUOKA.pdf | SHEET C | 80°C | PRINT STANDBY STATE |
| 003 | OSAKA.pdf | SHEET C | 100°C | PRINT STANDBY STATE |

FIG. 7D

| JOB NUMBER | JOB NAME | SHEET TYPE | FIXING TEMPERATURE | STATE |
|---|---|---|---|---|
| 006 | HIROSHIMA.pdf | SHEET A | 50°C | PRINT PROCESSING IN PROGRESS |
| 004 | KANAGAWA.pdf | SHEET A | 70°C | PRINT STANDBY STATE |
| 007 | TOKYO.pdf | SHEET A | 40°C | PRINT STANDBY STATE |
| 002 | SAITAMA.pdf | SHEET B | 80°C | PRINT STANDBY STATE |
| 005 | FUKUOKA.pdf | SHEET C | 80°C | PRINT STANDBY STATE |
| 003 | OSAKA.pdf | SHEET C | 100°C | PRINT STANDBY STATE |

PRINTING APPARATUS, CONTROL METHOD THEREFOR, AND NON-TRANSITORY COMPUTER-READABLE STORAGE MEDIUM

BACKGROUND OF THE INVENTION

Field of the Invention

The present invention mainly relates to a printing apparatus.

Description of the Related Art

Some printing apparatuses can sort a plurality of print jobs and, for example, sort heating temperatures for printed sheets in predetermined order (see Japanese Patent Laid-Open No. 2015-168093). This can increase the speed of processing of a plurality of print jobs.

Along with the recent multi-functionality of a printing apparatus, a variety of sheet types can be used. However, for the purpose of preventing an increase in size of the printing apparatus, an apparatus arrangement that can replace a sheet can be considered. When replacing a sheet, downtime of the printing apparatus occurs. From this viewpoint, there is room for improvement of an arrangement described in Japanese Patent Laid-Open No. 2015-168093.

SUMMARY OF THE INVENTION

The present invention has been made in consideration of the above problem by the present inventor, and provides a technique advantageous in increasing the speed of processing of a plurality of print jobs.

One of the aspects of the present invention provides a printing apparatus capable of supporting a plurality of sheet types, comprising a reception unit configured to receive a plurality of print jobs, an analysis unit configured to analyze each print job received by the reception unit, a sorting unit configured to sort the plurality of print jobs received by the reception unit, a print unit configured to print by sequentially executing the plurality of sorted print jobs, and a heating unit configured to heat a printed sheet to fix a printing material on the sheet, wherein the analysis unit specifies a sheet type used to execute each print job, and also specifies, as a fixing temperature, a temperature for fixing the printing material on the sheet type, and while a given print job is executed, the sorting unit sorts, based on an analysis result of the analysis unit, a plurality of print jobs in a print standby state so that print jobs using the same sheet type are subsequently executed and the fixing temperatures corresponding to the print jobs are sorted in predetermined order.

Further features of the present invention will become apparent from the following description of exemplary embodiments (with reference to the attached drawings).

BRIEF DESCRIPTION OF THE DRAWINGS

FIGS. 7A, 7B, 7C, and 7D are tables each showing an example of a list of a plurality of print jobs.

DESCRIPTION OF THE EMBODIMENTS

Figure 1:
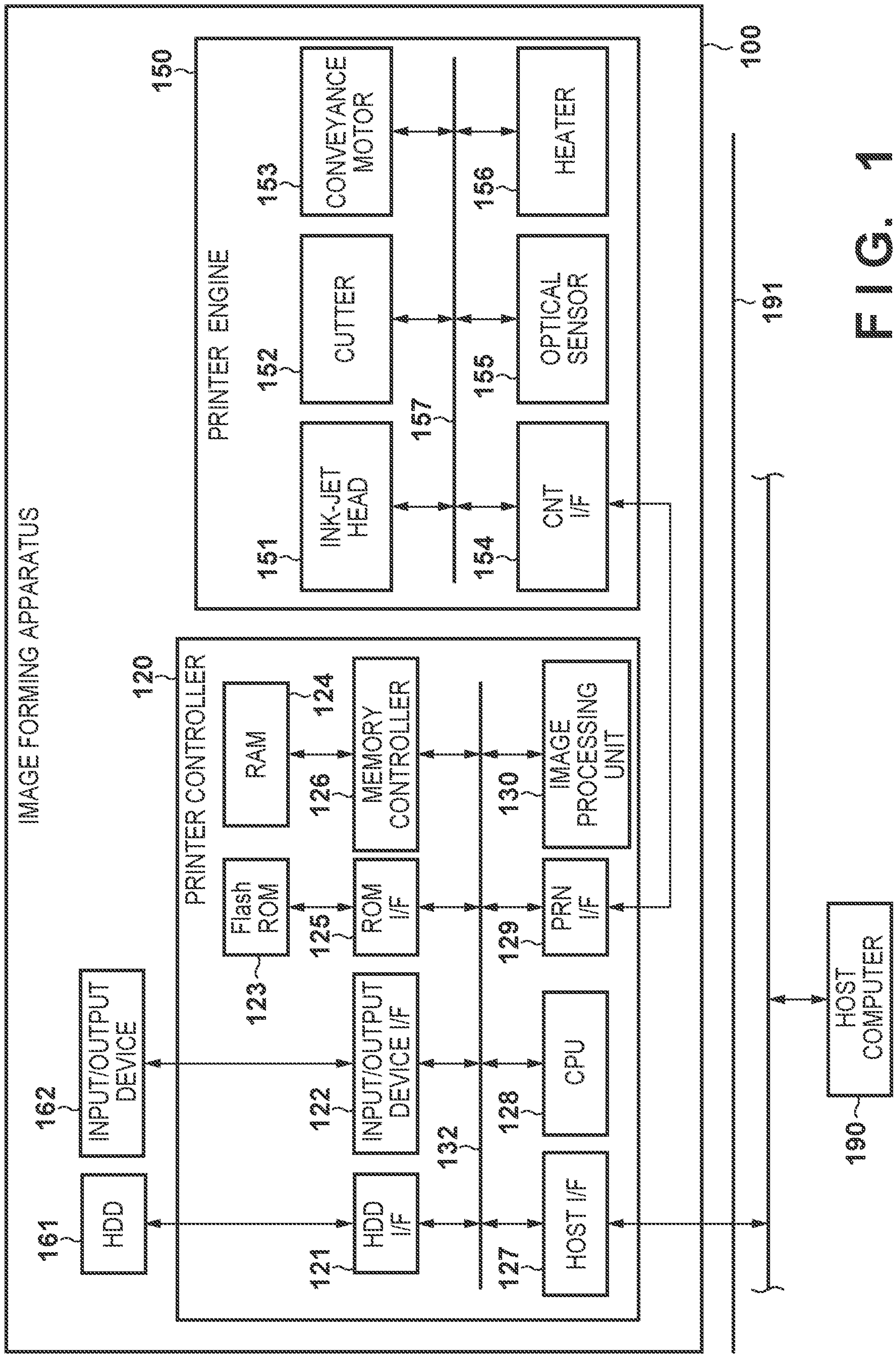
FIG. 1 is a block diagram showing an example of the arrangement of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a block diagram showing an example of the arrangement of an image forming apparatus 100 according to an embodiment. For the sake of descriptive simplicity, the image forming apparatus 100 having only a print function is exemplified. However, the image forming apparatus 100 is not limited to this example. For example, the image forming apparatus 100 may be a Multi-Function Peripheral (MFP) further having other known functions such as a copy function and a scan function. The image forming apparatus 100 may be expressed as the printing apparatus 100.

Note that in this embodiment, the print function is implemented by an inkjet method using ink as a printing material. However, the printing method is not limited to this example, and another known printing method such as an electrophotographic method using toner as a printing material may be adopted.

The image forming apparatus 100 includes a printer controller 120, a printer engine 150, a Hard Disk Drive (HDD) 161, and an input/output device 162. The image forming apparatus 100 is connected to a host computer 190 via a network 191.

The printer controller 120 includes an HDD interface (I/F) 121, an input/output device I/F 122, a ROM I/F 125, and a memory controller 126. The printer controller 120 further includes a host I/F 127, a Central Processing Unit (CPU) 128, a PRN I/F 129, and an image processing unit 130. These are interconnected via a system bus 132. Furthermore, the printer controller 120 includes a flash ROM 123 and a RAM 124, which are connected to the system bus 132 via the ROM I/F 125 and the memory controller 126, respectively.

Note that the PRN I/F 129 is an interface for enabling the printer controller 120 to communicate with the printer engine 150.

The CPU 128 is provided by a semiconductor package that can execute arithmetic processing, such as a microprocessor (microcomputer), and controls the operation of the overall system of the image forming apparatus 100 by executing programs or activating hardware. The flash ROM 123 stores programs to be executed by the CPU 128, data necessary for the operation of the image forming apparatus 100, and the like. The RAM 124 is used as a work area of the CPU 128, and as a memory that temporarily stores data received from the outside, setting data required for the operation of the image forming apparatus 100, and the like.

The image processing unit 130 performs predetermined image processing such as image processing for rasterizing or converting print data (mainly, data expressed by a page description language) into image data (for example, bitmap data). For example, the image processing unit 130 converts the color space (for example, YCbCr) of image data included in print data input from the outside into a standard RGB color space (for example, sRGB). Furthermore, the image processing unit 130 performs, for the image data, image conversion to convert the resolution into an effective pixel count processible by the image forming apparatus 100, and additionally performs known image processing such as image analysis and image correction. The thus obtained image data is stored in the RAM 124 or the HDD 161.

The printer engine 150 functions as a print control unit. The printer engine 150 includes an inkjet head 151, a cutter unit 152, a conveyance motor 153, a CNT I/F 154, an optical sensor 155, and a heater 156. These are interconnected via a system bus 157. Note that the CNT I/F 154 is an interface for enabling the printer engine 150 to communicate with the printer controller 120.

The inkjet head 151 is a printing execution unit for executing printing, and prints an image on a predetermined sheet (sheet-like print medium) based on image data. The inkjet head 151 is provided with a plurality of orifices for discharging ink, and is provided with a plurality of liquid discharge elements such as electrothermal transducers (heaters) or piezoelectric elements for discharging a liquid by generating discharge energy so as to correspond to the plurality of orifices. When the plurality of liquid discharge elements are individually driven, ink is discharged from a corresponding orifice.

As an example, the inkjet head 151 holds a plurality of printheads corresponding to a plurality of types (mainly, colors), and discharges ink of a corresponding type (mainly, a color) from an individual printhead in synchronism with conveyance of a sheet in the image forming apparatus 100, thereby forming an image on the sheet.

The cutter unit 152 is configured to cut a roll sheet (a wound long sheet which will sometimes simply be referred to as a "sheet" in this specification), and cuts a printed portion of the roll sheet. Note that if paper powder may be scattered by cutting by the cutter unit 152 (for example, in a case of a specific type of roll sheet), it is possible to make a setting to draw a cutting dust reduction line at a cutting position by the cutter unit 152 for the purpose of preventing paper powder from being scattered. This setting can be stored in the flash ROM 123.

Furthermore, the operation setting of the cutter unit 152 can be stored in the flash ROM 123 for each sheet type (each type of sheet). For a sheet type that is difficult to cut using the cutter unit 152, a setting (user cut setting) not to move the cutter unit 152 to allow the user to cut the roll sheet manually (for example, using scissors) can be stored in the flash ROM 123.

For a sheet type that requires the user to press the roll sheet when manually cutting the roll sheet, a setting (eject cut setting) to move the cutter unit 152 by a user operation can be stored in the flash ROM 123.

For a sheet type for which neither the user cut setting nor the eject cut setting is made, a setting (automatic cut setting) to cause the cutter unit 152 to automatically move can be stored in the flash ROM 123.

The conveyance motor 153 drives a conveyance roller to convey the roll sheet, and is controlled by the CPU 128.

The optical sensor 155 is a reflection optical sensor formed by light emitting elements such as a Light Emitting Diode (LED), a specular reflected light receiving element, and a diffuse light receiving element, and measures the attribute values of a print medium. For example, the attribute values include the intensities of specular reflected light and diffuse-reflected light of a sheet and the thickness of the sheet.

The heater 156 evaporates ink (water, solvent, and other liquid) on a sheet by sending hot air using a fan, thereby fixing ink on the sheet. It is possible to control the heating temperature by the heater 156 to a desired temperature.

Although details will be described later, the temperature for fixing ink on a sheet is expressed as the fixing temperature. Since ink types used by a print job, the number of ink types, the ratio among them, and the like can be different, the fixing temperature can be different for each print job.

The heating temperature by the heater 156 can be expressed as the heater temperature. The heater 156 is driven to set the heater temperature to the fixing temperature. In a case where it is necessary to replace a roll sheet, the heater temperature is lowered to a predetermined temperature (for example, 40° C.) so that the user can access the roll sheet.

The input/output device 162 includes physical keys and a panel capable of accepting a desired operation input from the user, and also includes a display unit for notifying the user of predetermined information or displaying it. As an example of the input/output device 162, a touch panel display can be used. The user may be notified of the information by a sound (voice, buzzer, or the like) using a sound source device such as a voice generator.

For example, when a sheet is supplied, the user can select a sheet type using the input/output device 162. This causes the image forming apparatus 100 to convey the sheet in a form set for each sheet type.

The HDD 161 is a nonvolatile storage device, and stores programs to be executed by the CPU 128, print data, setting information necessary for the operation of the image forming apparatus 100, and the like. Instead of the HDD 161, another known storage device such as a flash memory may be used.

The input/output device 162 is part of the image forming apparatus 100 in this embodiment but is not limited to this arrangement example and may be, for example, externally connected via the network 191. Alternatively, the function of the input/output device 162 may be provided in the host computer 190 (to be described later). That is, the user can use the host computer 190 instead of using the input/output device 162. Another input/output device may additionally be connectable to the image forming apparatus 100 via the network 191.

The host computer 190 is, for example, an external apparatus serving as a print data supply source in this embodiment, and a printer driver is installed on the host computer 190. Instead of the host computer 190, for example, another electric apparatus serving as a print data supply source, such as a digital camera, a smartphone, or an image reader, may be used. Although the host computer 190 and the image forming apparatus 100 are connected by the network 191, the present invention is not limited to this, and they may be connected by wireless communication.

Figure 2:
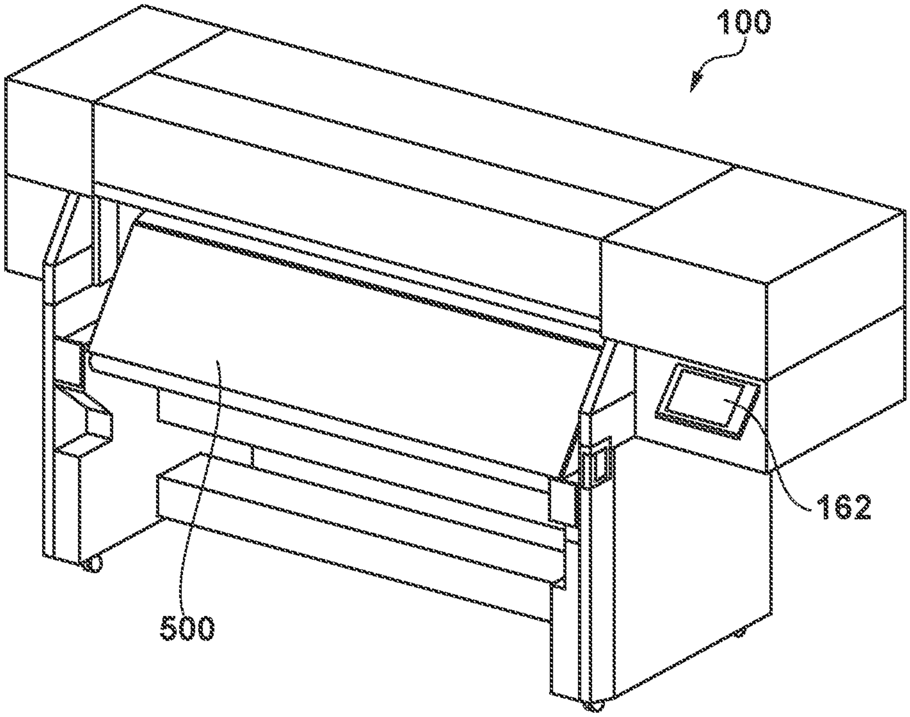
FIG. 2 is a view showing an aspect of the outer appearance of the image forming apparatus.
Figure 3:
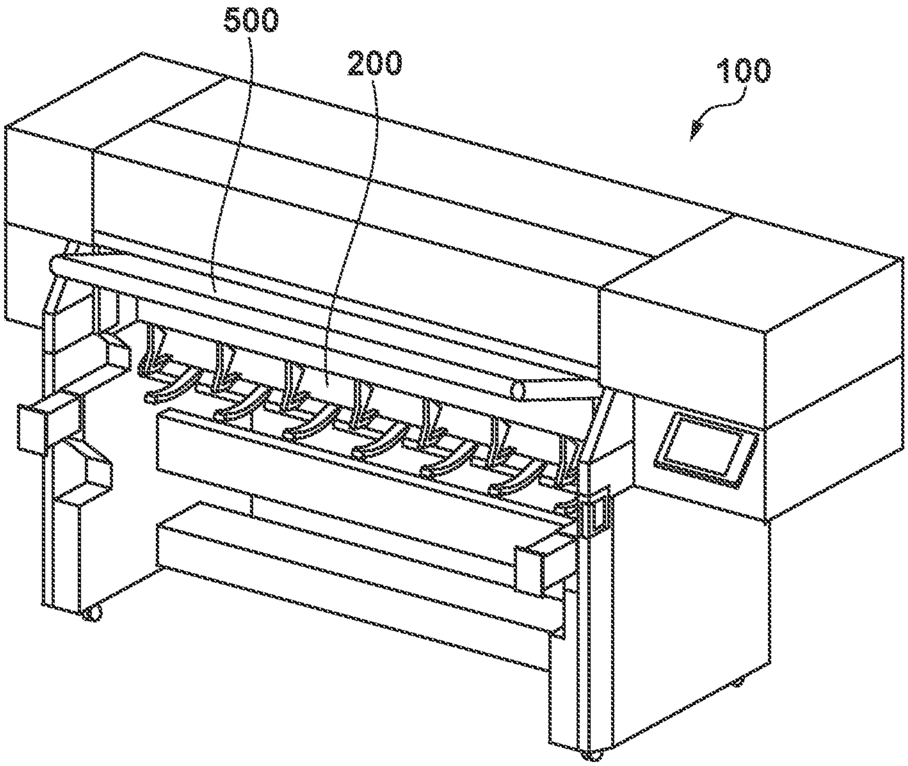
FIG. 3 is a view showing an aspect of the outer appearance of the image forming apparatus.

FIG. 2 shows an aspect of the outer appearance of the image forming apparatus 100, and FIG. 3 shows another aspect. The image forming apparatus 100 includes a sheet discharge guide unit 500 that can be opened/closed, and can expose a sheet setting unit 200 in the image forming apparatus 100 by setting the sheet discharge guide unit 500 in an open state. A roll sheet (a roll sheet 1 to be described later) can be set in the sheet setting unit 200.

The roll sheet 1 set in the sheet setting unit 200 is conveyed in the image forming apparatus 100, and is also printed by the above-described inkjet head 151. The cutter unit 152 cuts the printed roll sheet 1.

Note that the roll sheet 1 is actually set in the sheet setting unit 200 but the roll sheet 1 is sometime expressed to be set in the image forming apparatus 100 for the sake of descriptive simplicity.

Figure 4:
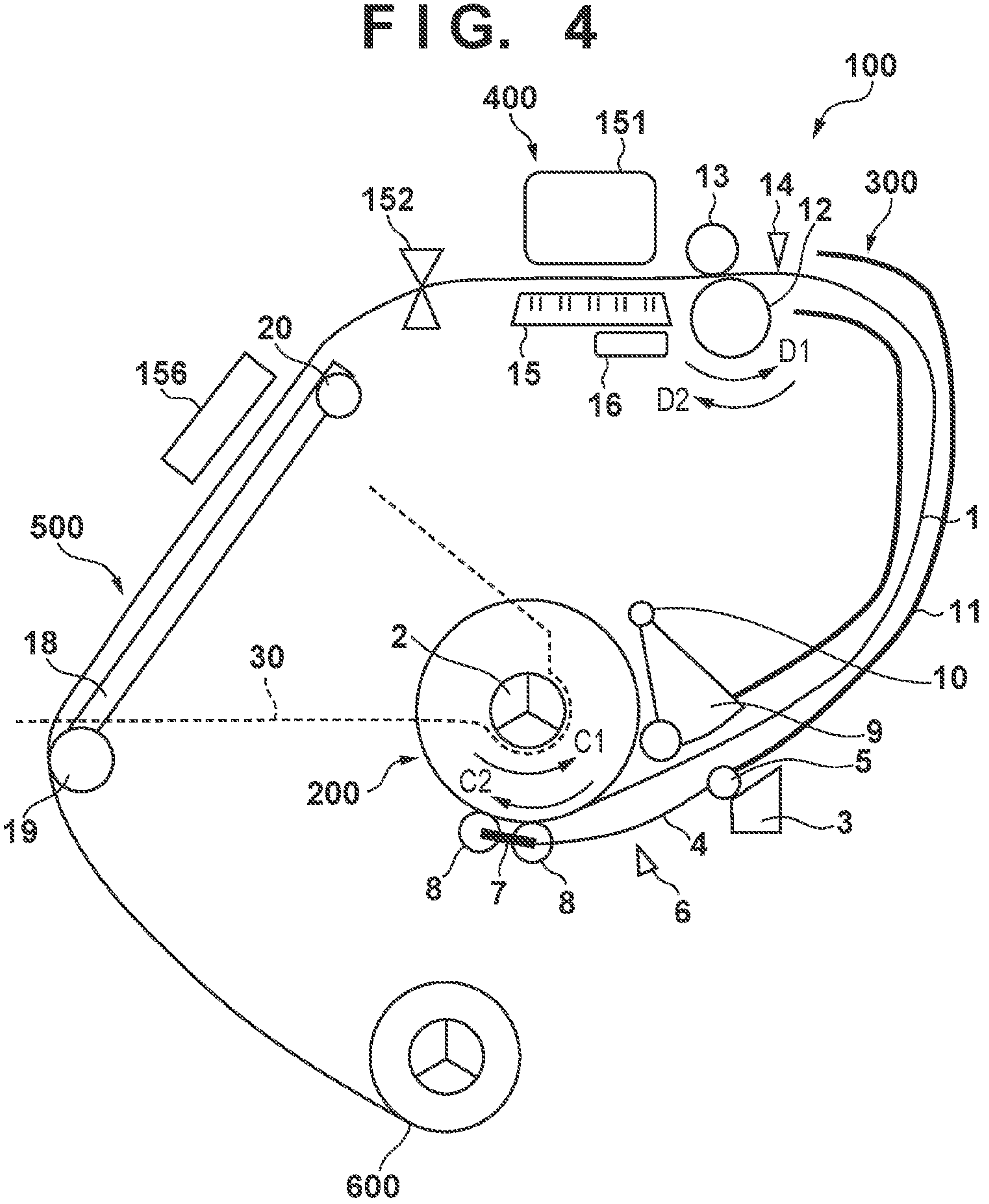
FIG. 4 is a schematic sectional view of the main part of the image forming apparatus.

FIG. 4 is a schematic sectional view of the main part of the image forming apparatus 100. By setting the sheet discharge guide unit 500 in a closed state, the roll sheet 1 set in the sheet setting unit 200 is drawn to a sheet conveyance unit 300, and conveyed to a print unit 400 through the sheet conveyance unit 300. In the print unit 400, the above-described inkjet head 151 executes printing, and then the roll sheet 1 is discharged to the sheet discharge guide unit 500. Note that a printing method by the inkjet head 151 in the print unit 400 may be a serial method or a full line method.

A shaft-shaped roll support member 2 is inserted into a hollow in the central portion of the roll sheet 1, and the roll support member 2 can rotate in a direction of an arrow C1 (forward rotation) or rotate in a direction of an arrow C2 (reverse rotation) by a motor (not shown).

The sheet setting unit 200 and its peripheral structure are configured to draw the roll sheet 1 from the sheet setting unit 200 to a conveyance guide unit 11, and a known arrangement is adopted as the arrangement. In this embodiment, a driving unit 3, an arm member (moving body) 4, an arm rotating shaft 5, a first sheet sensor 6, a swing member 7, driven rotating bodies (press-contact bodies) 8, a separation flapper (upper guide body) 9, and a flapper rotating shaft 10 can be arranged in the sheet setting unit 200.

The conveyance guide unit 11 guides, to the print unit 400, the roll sheet 1 drawn from the sheet setting unit 200. A conveyance roller 12 can rotate in a direction of an arrow D1 (forward rotation) or rotate in a direction of an arrow D2 (reverse rotation) by the conveyance motor 153, and is driven in response to detection of the leading edge of the roll sheet 1 by a second sheet sensor 14. A nip roller 13 is a driven roller according to the rotation of the conveyance roller 12, and can come close to or separate from the conveyance roller 12 by a motor (not shown), thereby adjusting the nip force.

At this time, the speed of conveyance of the roll sheet 1 by the conveyance roller 12 is set higher than the speed of drawing of the roll sheet 1 by the rotation of the roll support member 2. Therefore, the roll sheet 1 is conveyed without deflection while being maintained in a pulled state by the back tension, thereby making it possible to prevent possible folding of the roll sheet 1 during conveyance and suppress occurrence of an error in the conveyance.

In the print unit 400, a platen 15 is arranged to face the inkjet head 151, and a suction hole is formed in the platen 15 to apply a negative pressure generated by a suction fan 16 to the sheet 1. This causes the back surface of the sheet 1 to be sucked by the platen 15, thereby making it possible to improve the quality of printing on the sheet 1 by the inkjet head 151. The thus printed roll sheet 1 is cut by the cutter unit 152.

The conveyance guide 18 is provided in the sheet discharge guide unit 500, and guides the sheet 1 drawn from the print unit 400 to a winding unit 600. When the leading edge of the sheet 1 is fixed to a sheet tube set in the winding unit 600 and the sheet tube rotates in accordance with the conveyance speed of the conveyance roller 12, the sheet 1 printed by the print unit 400 is continuously wound by the winding unit 600.

A driven roller 19 is provided in an end portion on the winding side of the conveyance guide 18, thereby making it possible to prevent possible folding of the sheet 1 and to convey the sheet 1 while reducing the conveyance resistance of the driven roller 19. At this time, the sheet 1 is not deflected. The heater 156 is provided above the conveyance guide 18, and heats the sheet 1 by sending hot air during conveyance, and thus ink on the sheet 1 is evaporated and fixed on the sheet 1.

Note that the conveyance guide 18 and the driven roller 19 can pivot about a guide rotating shaft 20. When the roll sheet 1 is attached/detached to/from the sheet setting unit 200, the conveyance guide 18 and the driven roller 19 are retracted upward by pivoting, thereby making it readily easy to set the roll sheet 1.

In this embodiment, processing executed when the above-described image forming apparatus 100 capable of replacing the roll sheet 1 receives a plurality of print jobs will be described. In this embodiment, a plurality of print jobs are sorted based on information included in each print job. Examples of the information are print setting information concerning a sheet type used for printing based on the print job, and information representing the fixing temperature necessary for printing based on the print job. Note that more specifically, the fixing temperature necessary for printing based on the print job indicates the temperature for fixing, at the time of printing based on the print job, a printing material (ink or the like) on the sheet for the printing.

At the time of printing based on the print job, the heater 156 sends hot air so that the temperature of the sheet 1 reaches the fixing temperature necessary for the printing. Note that the heater 156 adjusts the temperature of hot air based on the temperature detected by a temperature sensor arranged at a blowing port of the heater 156, thereby controlling the fixing temperature. The fixing temperature necessary for printing based on the print job is arbitrarily set by the user as a print setting for printing of the print job. The present invention, however, is not limited to this. For example, the fixing temperature necessary for printing based on each print job may automatically be decided by the image forming apparatus 100 in accordance with contents of the print job.

More specifically, for example, the image forming apparatus 100 may decide the fixing temperature based on the amount of the printing material used for printing of the print job. More specifically, the image forming apparatus 100 may decide the fixing temperature so that the fixing temperature in a case where the amount of the printing material used for printing of the print job is large is higher than the fixing temperature in a case where the amount of the printing material used for printing of the print job is small.

For example, the image forming apparatus 100 may decide the fixing temperature based on the fact that white ink is used for printing of the print job. More specifically, the image forming apparatus 100 may decide the fixing temperature so that the fixing temperature in a case where white ink is used for printing of the print job is higher than the fixing temperature in a case where white ink is not used for printing of the print job.

For example, the image forming apparatus 100 may decide the fixing temperature based on the print setting concerning the quality of printing of the print job. More specifically, the image forming apparatus 100 may decide the fixing temperature so that the fixing temperature in a case where the print setting concerning the quality of printing of the print job is a high quality print setting is higher than the fixing temperature in a case where the print setting concerning the quality of printing of the print job is a standard quality print setting lower than the high quality print setting.

By the processing according to this embodiment, the plurality of print jobs are grouped by the sheet type, and are also sorted. The plurality of print jobs are sorted in the same order as the order of the necessary fixing temperature. This is done because replacement of the roll sheet 1 causes downtime of the image forming apparatus 100 and it is thus required to reduce the number of times of sheet replacement. Furthermore, in a case where the plurality of print jobs are processed in order different from the order of the necessary fixing temperature, it takes a relatively long time to reach the fixing temperature between the plurality of printing operations executed based on the print jobs, thereby causing the downtime.

Figure 5:
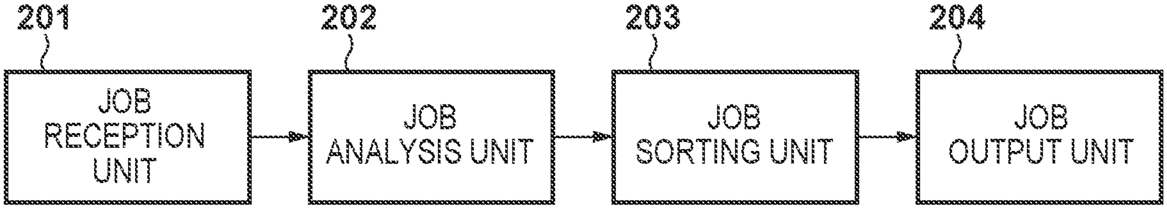
FIG. 5 is a functional block diagram of a printer controller.

FIG. 5 is a functional block diagram of the printer controller 120. The printer controller 120 includes a job reception unit 201, a job analysis unit 202, a job sorting unit 203, and a job output unit 204.

The job reception unit 201 receives a print job from the host computer 190 or acquires a print job from a server (not shown) via the network 191. The print job includes print setting information concerning a sheet type used for printing based on the print job, and also includes print setting information concerning the size of the sheet (sheet size). The information representing the sheet type or the sheet size can be expressed as sheet information. The job analysis unit 202 analyzes the print job to specify the sheet information, calculates the fixing temperature necessary to execute printing based on the print job, and specifies or decides the fixing temperature. The job sorting unit 203 sorts the printing order of the plurality of print jobs based on the fixing temperatures. The sort processing may be performed based on the analysis result (fixing temperature) of the job analysis unit 202 and all or some of the pieces of sheet information of the sheet size, the sheet type, and the like. The job output unit 204 outputs the plurality of print jobs in the printing order sorted by the job sorting unit 203.

For the sake of descriptive simplicity, the sorting of the printing order by the job sorting unit 203 will sometimes simply be expressed as "sorting" hereinafter but may be expressed as the sorting of the plurality of print jobs.

Figure 6A:
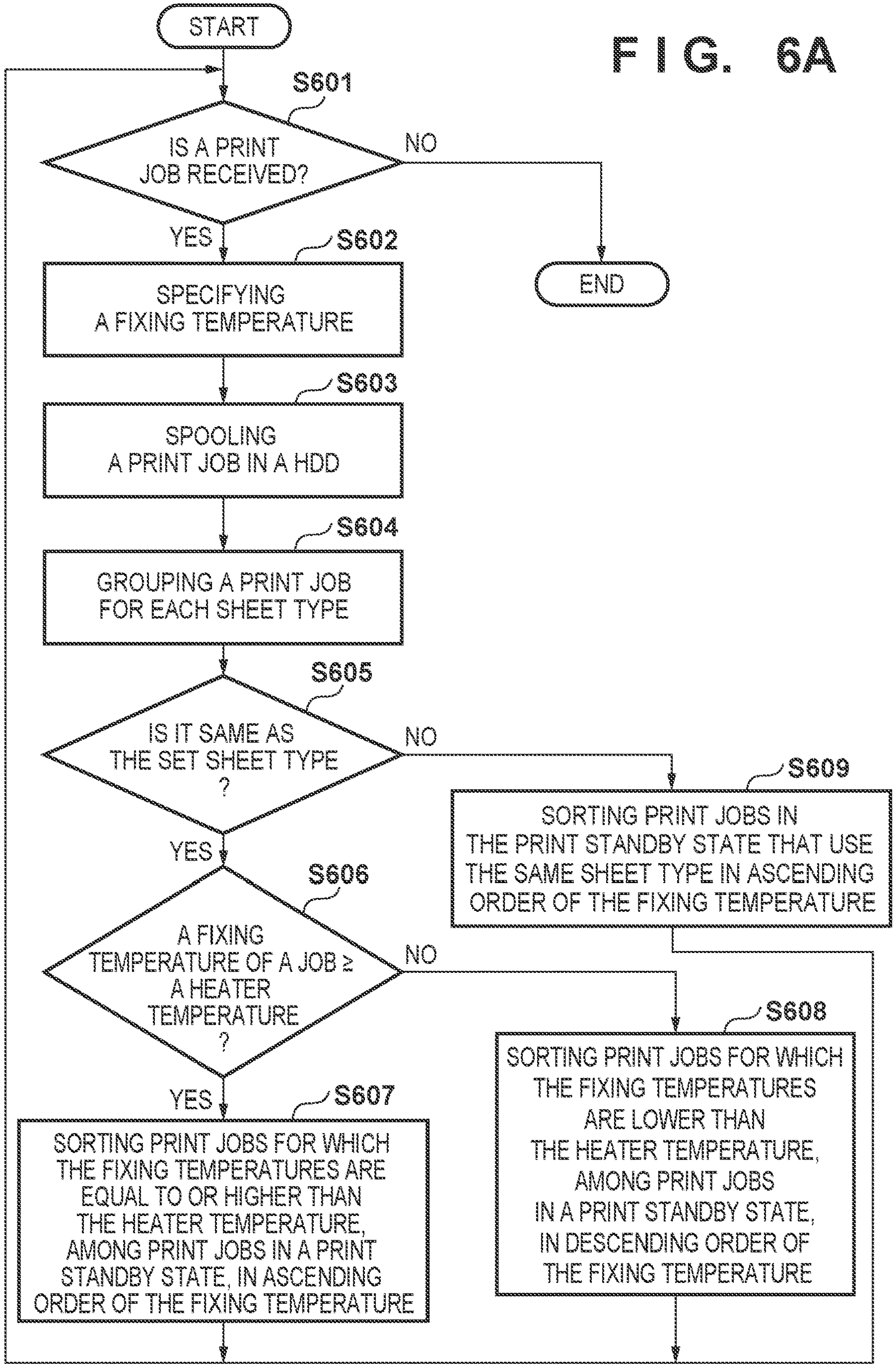
FIGS. 6A and 6B are flowcharts of a printing method or an image forming method.
Figure 6B:
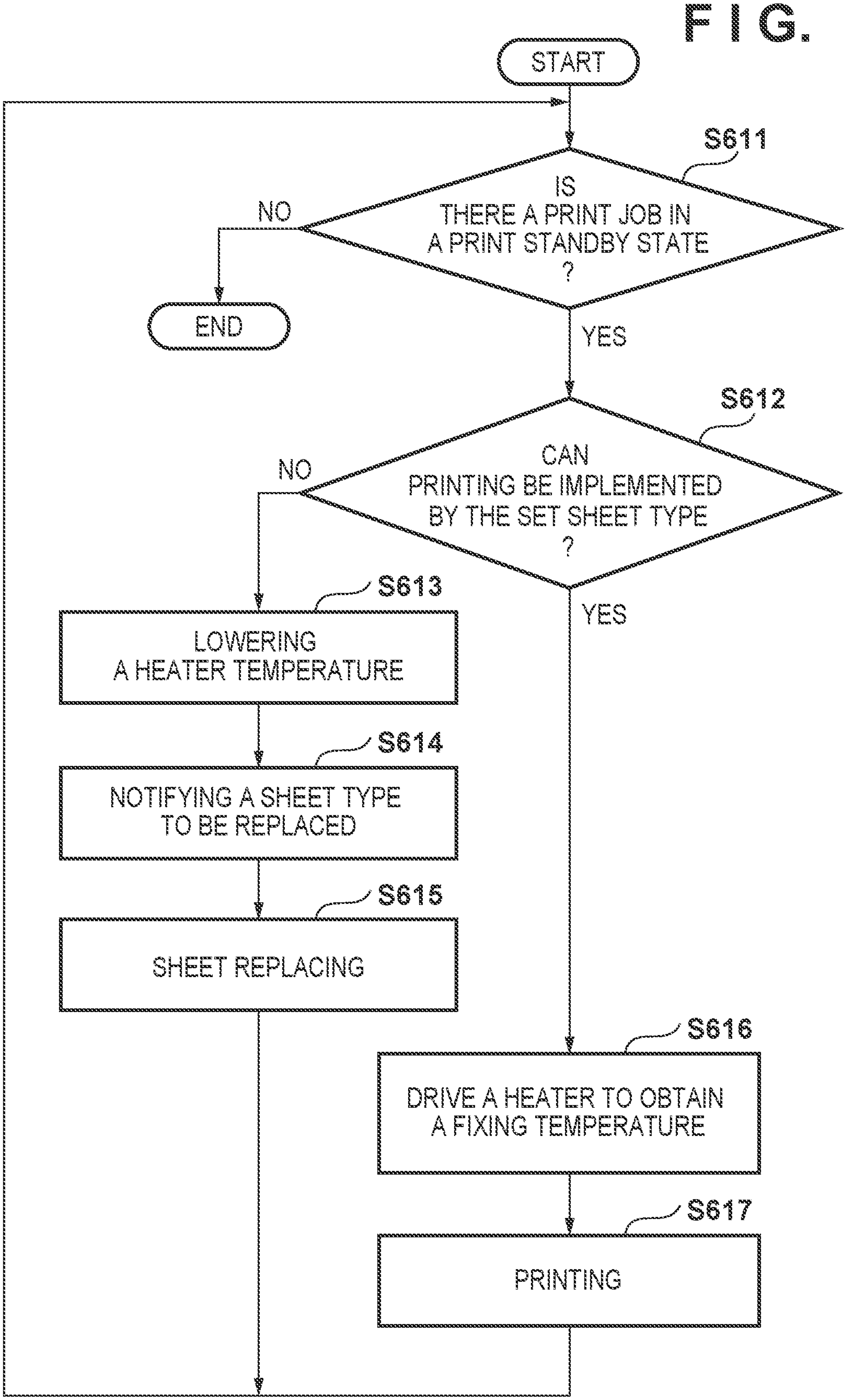

FIGS. 6A and 6B are flowcharts of a printing method or an image forming method according to this embodiment. These flowcharts are mainly executed by the printer controller 120. FIG. 6A shows processing contents from when a print job is received until sort processing is executed.

In step S601 (to be simply referred to as "S601" hereinafter) (the same applies to other steps to be described later), it is determined whether a print job is received. If a print job is received, the process advances to S602; otherwise, the flowchart ends.

In S602, the print job received in S601 is analyzed to specify the fixing temperature.

In S603, the print job is spooled in the HDD 161. In S604, the print job is grouped by the sheet type.

In S605, it is determined whether the sheet type used by the print job is the same as a sheet type set in the image forming apparatus 100. If the sheet types are the same, the process advances to S606; otherwise, the process advances to S609.

In S606 (that is, if the sheet type used by the print job is the same as the sheet type set in the image forming apparatus 100), the fixing temperature specified based on the print job is compared with the current temperature (heater temperature) of the heater 156. If the fixing temperature is equal to or higher than the heater temperature, the process advances to S607; otherwise (if the fixing temperature is lower than the heater temperature), the process advances to S608.

In S607 (that is, if the fixing temperature is equal to or higher than the heater temperature), among the print jobs in a print standby state, print jobs for which the fixing temperatures are equal to or higher than the heater temperature are sorted in ascending order of the fixing temperature.

In S608 (that is, if the fixing temperature is lower than the heater temperature), among the print jobs in the print standby state, print jobs for which the fixing temperatures are lower than the heater temperature are sorted in descending order of the fixing temperature.

If the sheet type used by the print job is not the same as the sheet type set in the image forming apparatus 100 (NO is determined in S605 and the process advances to S609), it is necessary to replace the sheet to implement printing. Since the heater temperature needs to be lowered to the predetermined temperature (40° C.) to replace the sheet, print jobs in the print standby state that use the same sheet type are sorted in ascending order of the fixing temperature in S609. Note that the heater temperature is detected by the temperature sensor arranged at the blowing port of the heater 156. In this embodiment, the heater temperature is lowered by taking outside air into the image forming apparatus 100 (for example, the periphery of the heater 156), that is, by air cooling.

Note that in a case where the number of print jobs for which the fixing temperatures are equal to each other is two or more, the sort processing is performed so as to execute the two or more print jobs in the reception order.

FIG. 6B is a flowchart for printing the print jobs in order according to the result of the sort processing.

In S611, it is determined whether there is a print job in the print standby state. If there is a print job in the print standby state, the process advances to S612; otherwise, the flowchart ends.

In S612 (if there is a print job in the print standby state), it is determined whether printing based on the print job can be implemented by the sheet type currently set in the image forming apparatus 100. If printing can be implemented, the process advances to S616; otherwise, the process advances to S613.

In S616 (if printing can be implemented), the heater 156 is driven to obtain the fixing temperature corresponding to the print job. After that, printing is executed in S617, and the process returns to S611.

In S613 (if printing cannot be implemented), the temperature of the heater 156 is lowered to a temperature (in this example, 40° C.) at which the sheet can be replaced. In S614, the user is notified of the sheet type to be replaced. In response to this, the user can replace the sheet (S615), and the process returns to S611 after the sheet replacement.

In the image forming apparatus 100 that requires sheet replacement, it is possible to reduce downtime by reducing the number of times of sheet replacement. According to this flowchart, it is possible to reduce the number of times of sheet replacement in a case where a plurality of print jobs in which sheet types used for printing are different are mixed, thereby reducing downtime, and shortening the processing time of the print jobs.

FIGS. 7A to 7D show some examples with respect to the aspect according to the above sort processing.

FIG. 7A shows an example of a list of a plurality of print jobs sent from the host computer 190. At this time, assume that sheet A is set as the sheet type in the image forming apparatus 100.

FIG. 7B shows a list after the sort processing is performed, and shows the execution order of the print jobs from above.

After the image forming apparatus 100 receives a print job #001 (see S601), and S602 to S611 are executed, it is determined in S612 that printing based on the print job can be implemented by sheet A currently set in the image forming apparatus 100. This drives the heater 156 to obtain 40° C. as the fixing temperature in S616, and printing is then executed in S617.

Before completion of printing based on the job #001, the host computer 190 can transmit jobs #002 to #006.

First, if the image forming apparatus 100 receives the job #002 (see S601), S602 to S604 are performed, and it is determined in S605 whether the sheet type used by the job #002 is the same as sheet A (the sheet type set in the image forming apparatus 100). In this example, since the sheet type used by the job #002 is sheet B, the print jobs using the same sheet type are sorted in ascending order of the fixing temperature in S609.

Next, if the image forming apparatus 100 receives the job #003 (see S601), S602 to S604 are performed and the determination processing is performed in S605 in the same manner. In this example, since the sheet type used by the job #003 is sheet C, the print jobs using the same sheet type are sorted in ascending order of the fixing temperature in S609.

After that, if the image forming apparatus 100 receives the job #004 (see S601), S602 to S604 are performed and the determination processing is performed in S605 in the same manner. In this example, since the sheet type used by the job #004 is sheet A, the heater temperature is compared with the fixing temperature in S606. In this example, since printing based on the job #001 is currently executed, the heater temperature is 40° C. To the contrary, the fixing temperature of the job #004 is 70° C. Therefore, the print jobs are sorted in ascending order of the fixing temperature in S607.

After that, if the image forming apparatus 100 receives the job #005 (see S601), S602 to S604 are performed and the determination processing is performed in S605 in the same manner. In this example, since the sheet type used by the job #005 is sheet C, the print jobs corresponding to sheet A are sorted in ascending order of the fixing temperature in S609.

At this time, with respect to the print jobs of sheet C, the job #003 is in the print standby state. The fixing temperature (80° C.) of the job #005 is lower than the fixing temperature (100° C.) of the job #003. Therefore, if sheet C is set in the image forming apparatus 100, the jobs #005 and #003 are executed in this order.

After that, if the image forming apparatus 100 receives the job #006 (see S601), S602 to S604 are performed and the determination processing is performed in S605 in the same manner. In this example, since the sheet type used by the job #006 is sheet A, the heater temperature is compared with the fixing temperature in S606. In this example, the fixing temperature of the job #006 is 50° C. Therefore, the print jobs are sorted in ascending order of the fixing temperature in S607.

At this time, with respect to the print jobs of sheet A, the job #004 is in the print standby state. The fixing temperature (50° C.) of the job #006 is lower than the fixing temperature (70° C.) of the job #004. Therefore, the jobs #006 and #004 are executed in this order.

FIG. 7C shows a list of the print jobs after completion of printing based on the job #001. Upon completion of printing based on the job #001, S611 and S612 are performed. The next print job of the job #001 is the job #006, and the sheet type used by the print job is the same as sheet A already set in the image forming apparatus 100. Therefore, in S616, the heater 156 is driven to obtain a temperature of 50° C.

To raise or lower the heater temperature, it takes a time corresponding to a temperature difference.

After the heater temperature becomes 50° C., printing based on the job #006 is started in S617.

FIG. 7D shows a list in a case where a print job similar to the job #001 is additionally received as a job #007.

If the image forming apparatus 100 receives the job #007 (see S601), S602 to S604 are performed and the determination processing is performed in S605 in the same manner. In this example, since the sheet type used by the job #007 is sheet A, the heater temperature is compared with the fixing temperature in S606.

In this example, the image forming apparatus 100 currently executes printing based on the job #006, and the temperature of the heater 156 is 50° C. The fixing temperature of the job #007 is 40° C. Therefore, in S608, the print jobs for which the fixing temperatures are lower than the current heater temperature are sorted in descending order of the fixing temperature, and the job #007 is executed after the job #004, as shown in FIG. 7D. That is, if a new print job is received, the insertion position of the new print job to the existing print jobs in the print standby state is decided based on the analysis result of the new print job.

According to this printing method or the image forming method, the plurality of print jobs in the print standby state are sorted, and the print jobs using the same sheet type are subsequently executed. To raise or lower the heater temperature, it takes a time corresponding to a temperature difference. According to this embodiment, the print jobs are sorted in predetermined order (descending or ascending order) of the fixing temperature based on the heater temperature. Therefore, according to this embodiment, it is possible to shorten the time taken to raise or lower the heater temperature. That is, it is possible to increase the speed of the processing of the plurality of print jobs.

Note that the image forming apparatus 100 that can replace the roll sheet 1 has been exemplified. However, even in an apparatus arrangement on which a plurality of types of roll sheets can be mounted, it takes a predetermined time to switch the sheet type, thereby causing downtime of the apparatus. Therefore, the contents of the embodiment are also applicable to an apparatus on which a plurality of types of roll sheets can be mounted.

(Program)

The present invention may be implemented by supplying a program for implementing one or more functions of the above-described embodiment to a system or apparatus via a network or storage medium and causing one or more processors in the computer of the system or apparatus to read out and execute the program. For example, the present invention may be implemented by a circuit (for example, an ASIC) which implements one or more functions. The program can be stored in a non-transitory computer readable medium to be executable by a predetermined processor.

(Others)

In the embodiment, individual elements are named by expressions based on their main functions. However, the functions described in the embodiment may be sub-functions, and the expressions are not strictly limited. Furthermore, the expressions can be replaced with similar expressions. In the same vein, an expression "unit (portion)" can be replaced with an expression "tool", "component", "member", "structure", "assembly", or the like. Alternatively, these may be omitted or added.

The concept of "print medium" can include not only paper used in general but also any materials capable of receiving ink, including fabrics, plastic films, metal plates, glass, ceramics, resins, wood, and leathers.

"Ink" should also be interpreted in a broader sense, like "print". Hence, the concept of "ink" can include not only a liquid that is applied to a print medium to form an image, a design, a pattern, or the like but also an incidental liquid that can be provided to process a print medium or process ink (for example, coagulate or insolubilize color materials in ink applied to a print medium).

This embodiment has explained the form in which a plurality of print jobs are sorted based on both print setting information concerning a sheet type and information representing the fixing temperature included in each print job. However, the present invention is not limited to this.

For example, a plurality of print jobs may be sorted not based on information representing the fixing temperature (without using the information representing the fixing temperature) but based on print setting information concerning a sheet type (using the print setting information concerning the sheet type). That is, the plurality of print jobs may be sorted in the same order as the order of the fixing temperature without grouping the plurality of print jobs by the sheet type.

Alternatively, for example, a plurality of print jobs may be sorted not based on print setting information concerning a sheet type (without using the print setting information concerning the sheet type) but based on information representing the fixing temperature (using the information representing the fixing temperature). That is, after grouping the plurality of print jobs by the sheet type, the plurality of print jobs need not be sorted in the same order as the order of the fixing temperature.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-028842, filed on Feb. 27, 2023, which is hereby incorporated by reference herein in its entirety.

What is claimed is:

1. A printing apparatus capable of supporting a plurality of sheet types, comprising:
- a memory containing instructions, and a processor for executing the instructions to operate as:
- a reception unit configured to receive a plurality of print jobs;
- an analysis unit configured to analyze each print job received by the reception unit;
- a sorting unit configured to sort the plurality of print jobs received by the reception unit;
- a print unit configured to print by sequentially executing the plurality of sorted print jobs; and
- a heating unit configured to heat a printed sheet to fix a printing material on the sheet,
- wherein the analysis unit specifies a sheet type used to execute each print job, and also specifies, as a fixing temperature, a temperature for fixing the printing material on the sheet type, and
- while a given print job is executed, the sorting unit sorts, based on an analysis result of the analysis unit, a plurality of print jobs in a print standby state so that print jobs using the same sheet type are subsequently executed and the fixing temperatures corresponding to the print jobs are sorted in predetermined order, and
- wherein the sorting unit compares, while the given print job is executed, a temperature of the heating unit with the fixing temperatures corresponding to the plurality of print jobs to be sorted,
- performs, based on a comparison result, the sorting so that the predetermined order is descending order or ascending order of the fixing temperature, and
- performs the sorting so the predetermined order is ascending order of the fixing temperature in a case where the fixing temperatures corresponding the print jobs to be sorted are higher than the temperature of the heating unit and so the predetermined order is descending order of the fixing temperature in a case where the fixing temperatures corresponding the print jobs to be sorted are lower than the temperature of the heating unit.

2. The apparatus according to claim 1, wherein
- the analysis unit analyzes a print job upon receiving the print job by the reception unit, and
- the sorting unit performs the sorting by deciding, based on an analysis result of the analysis unit, an insertion position of the print job to the plurality of print jobs in the print standby state.

3. The apparatus according to claim 1, further comprising a sheet setting unit configured to set a sheet corresponding to one of the plurality of sheet types to be replaceable.

4. The apparatus according to claim 1, wherein the print unit includes an inkjet head configured to execute printing by a plurality of types of inks.

5. A control method for a printing apparatus capable of supporting a plurality of sheet types, comprising the steps of:
- receiving a plurality of print jobs;
- analyzing each received print job;
- sorting the plurality of received print jobs;
- printing by sequentially executing the plurality of sorted print jobs; and
- heating a printed sheet to fix a printing material on the sheet,
- wherein in the analyzing step, a sheet type used to execute each print job is specified, and a temperature for fixing the printing material on the sheet type is also specified as a fixing temperature, and
- in the sorting step, while a given print job is executed, a plurality of print jobs in a print standby state are sorted, based on an analysis result in the analyzing, so that print jobs using the same sheet type are subsequently executed and the fixing temperatures corresponding to the print jobs are sorted in predetermined order,
- wherein the sorting step compares, while the given print job is executed, a temperature of the heating unit with the fixing temperatures corresponding to the plurality of print jobs to be sorted,
- performs, based on a comparison result, the sorting so that the predetermined order is descending order or ascending order of the fixing temperature,
- performs the sorting so the predetermined order is ascending order of the fixing temperature in a case where the fixing temperatures corresponding the print jobs to be sorted are higher than the temperature of the heating unit and so the predetermined order is descending order of the fixing temperature in a case where the fixing temperatures corresponding the print jobs to be sorted are lower than the temperature of the heating unit, and
- performs the sorting so the predetermined order is ascending order of the fixing temperature in a case where the fixing temperatures corresponding the print jobs to be sorted are higher than the temperature of the heating unit and so the predetermined order is descending order of the fixing temperature in a case where the fixing temperatures corresponding the print jobs to be sorted are lower than the temperature of the heating unit.

6. A non-transitory computer-readable storage medium storing a program, the program configured to cause a computer to execute each step of a control method defined in claim 5.

* * * * *